(12) United States Patent
Joost

(10) Patent No.: US 6,327,568 B1
(45) Date of Patent: Dec. 4, 2001

(54) DISTRIBUTED HARDWARE SHARING FOR SPEECH PROCESSING

(75) Inventor: Michael Joost, Krefeld (DE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/189,528

(22) Filed: Nov. 10, 1998

(30) Foreign Application Priority Data

Nov. 14, 1997 (EP) .................................. 97203554

(51) Int. Cl.[7] .............................. G10L 11/00; G06F 9/50; G06F 13/12; G06F 15/16; G06F 15/80
(52) U.S. Cl. .................. 704/270.1; 704/270; 704/275; 704/251; 709/104; 705/8
(58) Field of Search .................................. 704/231, 200, 704/9, 270, 270.1, 275, 251; 379/88; 709/315, 332, 104; 705/8; 700/99

(56) References Cited

U.S. PATENT DOCUMENTS

| | | | |
|---|---|---|---|
| 4,955,054 | * 9/1990 | Boyd, Jr. et al. | 704/231 |
| 5,349,526 | * 9/1994 | Potts, Sr. et al. | 704/9 |
| 5,471,521 | * 11/1995 | Minakami et al. | 379/88 |
| 5,553,119 | * 9/1996 | McAllister et al. | 704/231 |

* cited by examiner

Primary Examiner—Richemond Dorvil
Assistant Examiner—Daniel Nolan
(74) Attorney, Agent, or Firm—Daniel J. Piotrowski

(57) ABSTRACT

In a multistation intercommunication system human speech is processed on at least two respective levels of generic complexity. The speech is received in one or more origin stations in parallel and a necessity is detected to understand the speech in an associated application environment. Intercommunication is controlled in a distributed manner, by detecting temporal speech items to be recognized and dynamically assigning speech items amongst one or more of a plurality of distributed speech recognizing facilities to eventually generate recognized items. Further intercommunication is controlled to understand recognized items in a further context of the application in question through assigning the recognized items amongst one or more of a plurality of speech understanding facilities to generate speech items that have been understood. Assigning is effected in a distributed manner as based on a combination of contingency and statistics.

5 Claims, 2 Drawing Sheets

DISTRIBUTED HARDWARE SHARING FOR SPEECH PROCESSING

BACKGROUND OF THE INVENTION

The invention relates to a method for operating a multi-station intercommunication system provided with human speech recognition. U.S. Pat. No. 5,471,521 describes a system in which a first computer handles an incoming telephone call, whereas a second computer performs the desired technical processing. Various server classes may be present. The present inventor has recognized a need in mass communication systems that accommodate many distributed subscribers, to allocate available facilities in an efficient manner, whilst recognizing the various levels in speech processing complexity and the frequent change of processing dynamics between various such levels on short notice. Further, the system should provide high reliability, and therefore be able to reconfigure its topology automatically.

SUMMARY TO THE INVENTION

In consequence, amongst other things, it is an object of the present invention to improve distributed speech processing methods in such manner that computer-intensive tasks will be allocated on a dynamic basis to an instantaneously best suited facility, so that overall processing throughput would be optimized and local overload avoided to a high degree, and such against only a limited amount of overhead. Now therefore, according to one of its aspects the invention is characterized as recited in the characterizing part of claim 1.

The invention also relates to a system arranged for executing a method as claimed in claim 1. The invention also relates to a subsystem facility arranged for operating in a method context as claimed in claim 1, and/or as part of a system as claimed in claim 2. Further advantageous aspects of the invention are recited in dependent Claims.

BRIEF DESCRIPTION OF THE DRAWING

These and further aspects and advantages of the invention will be discussed more in detail hereinafter with reference to the disclosure of preferred embodiments, and in particular with reference to the appended Figures that show.

DETAILED DESCRIPTION OF PREFERRED EMBODIMENTS

Figure 1:
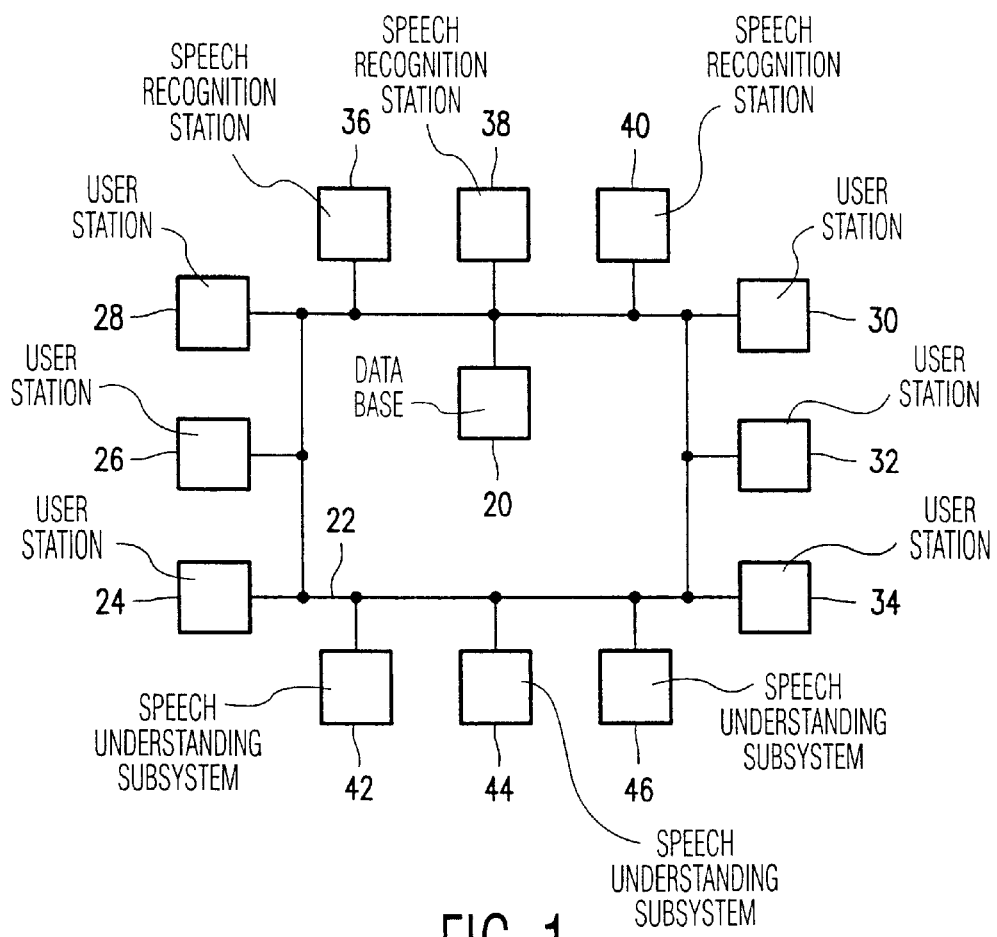
FIG. 1, a system diagram of the present invention.

FIG. 1 is a system diagram of the present invention. In the diagram a physical network 22 has been shown in the form of a ring. However, the organization of the network is generally irrelevant for the invention. Also, network protocols have been ignored. In the embodiment, there are many user stations, of which only numbers #24–34 have been shown. The user stations are suitable for receiving user person speech, and if required, also for outputting machine-generated speech or other types of simulated human speech, such as from a tape recording. A user station may be an unattended gateway into a telephone network. Alternatively, the system output may be in the form of a character display. In practice, the overall number of stations may go up to the millions range, of which at any instant several thousands may be operative in an actual dialog. The dialog may pertain to an information system, wherein the user undertakes to access a large data base 20. Another field of use may relate to an ordering service for items such as train tickets, or to a mass interview system, wherein the system poses questions and check answers as to their cognitive content. The dialog may from both sides relate to information that has an uncertain content or structure towards the other side, and wherein based on the outcome of the dialog the system will make a relevant selection.

Now the analog speech is received in the applicable front end device or receiver station, and converted into a stream of digital codes that allow easy transfer on network 22. Alternatively, the terminals may directly receive digital coded speech, e.g. from an ISDN telephone network.

Now, the processing of the speech received may require analysis on various different levels. For the purpose of disclosure, in the embodiment only two different sets of servers have been shown. Firstly, speech recognition stations 36–40 are arranged for receiving strings of digital codes and for using word models, language models and possibly further models to map the stream of speech on a destination sequence of words, phonemes or other items. Finally, speech understanding subsystems 42–46 are arranged for receiving the string of words et cetera so recognized, and for using one or more dialog models to map the stream of recognized words on stringed information, that has such content as to be relevant in the actual progress of the dialog. Alternatively, the system may present some kind of "failed" indication and exhort the user person to change tactics, such as to repeat or to reformulate an earlier utterance. Presumably, the user person will eventually have presented some sensible speech information, to which system 20 may present some output that would be suitable in the context of the dialog. The output may be a repartee to a user person statement, a solution to a problem, a verisimilar item such as one that indicates to a user what has indeed been understood by the system, or a further inquisitive statement. In principle, still further types of answer are feasible.

In the above, the assigning of the various tasks to the elements of distributed facility will be done by the system as a whole and in a distributed manner, the user applications being passive in this respect, apart from their signaling that some assistance is necessary on a particular level of complexity or functionality. After a particular processing facility has been assigned to the application in question, the user station may forward the information to be processed.

Figure 2:
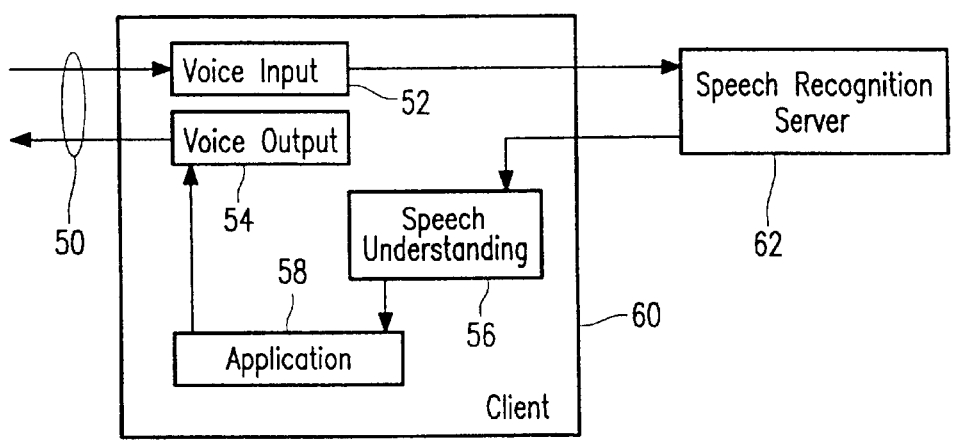
FIG. 2, a block diagram of a requester station.

FIG. 2 is a block diagram of a requester station 60 that may be closely associated to a particular user station or front end station. The user person is linked by bidirectional speech channel 50 to the system. The speech is bidirectionally converted by a voice input subsystem 52 and by a voice output subsystem 54. The converted speech information is forwarded to speech recognition server 62. The recognized speech is sent back to local station 60, and subsequently locally processed in speech understanding module 56. The speech so understood is sent to block 58, which represents the actual application, and which then may control the output line of connection 50. It has been found that speech recognition is often relatively computer-intensive as compared to most other processing items, such as speech understanding, so that the dynamics of the dialog favour the usage of a fast but remote speech recognition subsystem 62, versus a local speech understanding module 56. In FIG. 1, also the speech understanding has been deemed sufficiently complex to also warrant remote executing thereof. Such may be caused by the complexity of the underlying information exchange facility, by the degree of certainty required to check whether the speech has indeed been understood correctly, by certain security aspects of the net transfer that must be safe from intrusion, and possibly other aspects, that all would necessitate the use of massive computer facilities. In FIG. 2, the speech recognition server is one instance of such service. In practice, a server machine may host several speech recognizer instances, and therefore, be capable of providing service to multiple clients simultaneously, all operating under the constraint of real-time. Furthermore, because users talk only a fraction of total dialog time, a recognition server instance can be shared among multiple clients. Realtime reacting on a user utterance may have a delay corresponding to human subjective expectations, that may well be in the order of a tenth of a second. Furthermore, the client system shown may be dedicated to handle the I/O traffic, such as voice data to multiple telephone lines, database access, and the application program.

Figure 3:
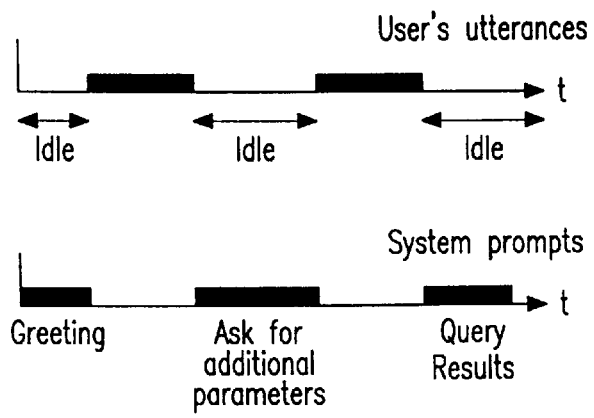
FIG. 3, an interactivity diagram of the system.

FIG. 3 is an interactivity diagram of the system, based on a two-sided dialog. The bottom line indicates that upon detecting an incipient dialog, such as by a user taking off a telephone mouthpiece, the system will output a greeting statement, and possibly a first question or exhortation statement. The top line indicates that the user person may then come up with a first question or with a first answer, in speech. Next, the bottom line indicates that in reaction thereon the system presents a further statement, question, or other speech item to the user. This may be followed by a further utterance from the user on the top line. Eventually, the system will present a final amount of information or affirm the user request. Then it takes leave from the user person. As long as the system outputs speech, the recognition facility may remain idle with respect to the dialog in question; this may also apply to pauses in the user generated speech. Furthermore, the reception of a human-generated utterance may cause the actual machine generated speech to be interrupted.

Figure 4:
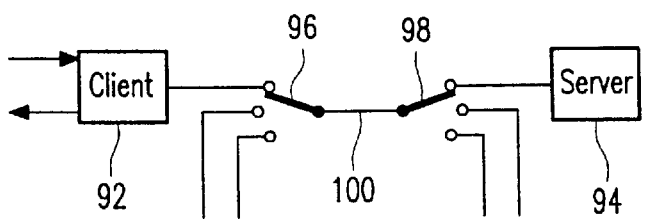
FIG. 4, an association of stations and server stations.

FIG. 4 shows an association of user stations such as 92 and server stations such as 94 that by means of selectors 96, 98 are connected to network 100. If a speech recognizer facility is hosted in a network environment, it may be shared among different dialogs, such as in order to utilize computer power during pauses in another dialog. With such scenario, the number of speech recognizers realized in hardware or software may be much less than the actual number of simultaneously active dialogs without violating the constraint for recognition in real-time. The speech recognizer is assigned to an application dialog on a per-utterance basis, but generally not assigned permanently to a particular dialog. The voice data stream is routed to an available voice recognizer. The recognizer then activates an appropriate recognition context, such as language model and lexicon, each time a new utterance is being assigned to that particular server. In an environment with multiple speech recognition servers and multiple client systems each utterance may be evaluated on a different server, and each speech recognition server may receive consecutive utterances from various different client systems and/or dialogs. Depending on the computer power of the servers, they may each offer several parallel speech recognizer processes, operating under the real-time constraint. Also, clients may serve multiple parallel dialogs. In this scenario, the utterance-based routing offers the greatest flexibility in utilizing the available computing facilities.

Figure 5:
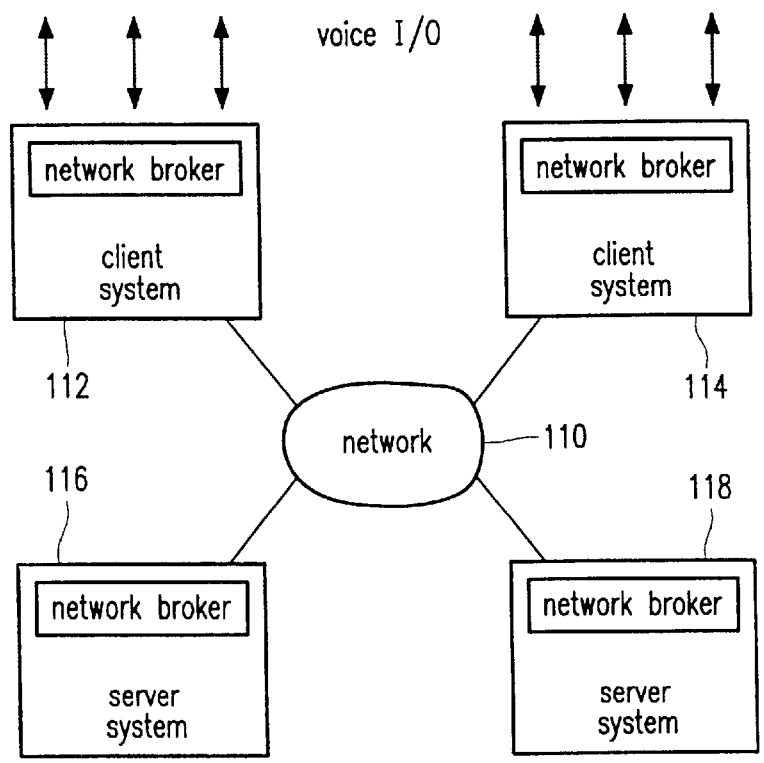
FIG. 5, a distributed network broker device.

FIG. 5 shows a distributed broker organization with respect to network 110. In information systems controlled by a natural language speech dialog, the speech recognizers may be collected on server systems 116, 118, that are connected to the application client systems 112, 114, over the network. The network organization has a respective local network broker in each of the four systems shown which are the entities responsible for coordinating the requesters and the resources. If a particular dialog on a particular client system needs a speech recognizer, because a speaker has started an utterance, the broker in question undertakes to find an available speech recognizer that may be located on an arbitrary server system in the network. The broker will then route the voice data stream to that particular speech recognizer entity and will return the resulting wordgraph back to the dialog application on the client system.

To reduce machine-dependency and manual configuring efforts, the network broker is a completely decentralized structure. It uses an automatic dynamic configuration mechanism that can adapt to any currently existing configuration of client and server systems. Additional server and client stations may be added to the environment without the need to disrupt or to make any changes to the previously existing systems. Upcoming clients may immediately use the available servers, and upcoming servers will be immediately considered by the clients for use. If a client or server system fails or is switched off, then only the dialogs handled by this particular machine will be affected. The remainder of the configuration will automatically reconfigure to operate without the component that has been removed.

The network broker consists of two sorts of entities, one residing on the client side and one residing on the speech recognition server side. Since each such entity deals with multiple entities of its counterpart, there is a many-to-many relationship between broker entities. Each network broker may manage multiple dialogs or speech recognizers.

The speech recognizers are assembled on server systems, that are connected to the application client systems over the network. The network broker is the entity responsible for coordinating the requesters and resources. If a dialog on a client system has the need for a speech recognizer, the broker will undertake to find an available speech recognizer on any server system present in the network. A simple statistical method is used to assign an appropriate resource. The method for load distribution ensures that the real-time constraint for speech recognition is observed, that is, no more simultaneous utterances should be assigned to a recognition server system than could be evaluated in real-time. The risk for conflicting allocations from multiple clients is minimized by a random selection method. Different processor resource requirements of various utterances are also handled by the load distribution without the need for estimate calculations. The method has the following advantages:

Easy to implement

Capable to manage as based on distributed resource information, such as availability of recognizers and their respective capabilities and associated contexts, such as language models, lexicons, et cetera.

The selection procedure is straightforward. The clients may use a table of available resources of all servers, and do not have to visit each server separately to find an available recognizer. The assigning is thus performed quickly to satisfy real-time constraints.

Concurrent accesses from multiple clients to the same server are resolved by a manager on the server in question. The manager decides which clients will be associated with the available recognizers.

Reserved recognizers are configured on the servers that may be assigned in congestion situations, even if those assignments would violate the real-time capability of that particular server. The load distribution algorithm ensures that reserved resources will then be assigned only in exceptional situations, either when no other real-time capable recognizer is available in the network, or if a concurrent request occurs for the last real-time capable resource of a server.

A particular advantage of the remote and distributed processing according to the invention is that such system is nearly fool-proof, because no effort is necessary for setting up the configuration.

What is claimed is:

1. A method for operating a multistation intercommunication system, wherein speech processing is executed on at least two respective levels of generic complexity with respect to speech receivable on multiple parallel stations coexistently, characterized in that said method comprises the steps of:

receiving human speech in one or more origin stations and detecting a necessity for understanding such speech in an associated application environment;

controlling the actual intercommunication in a distributed manner, by detecting temporal speech items to be recognized and automatically dynamically assigning the speech items instantaneously to one or more of a plurality of distributed speech recognizing facilities to eventually generate recognized items;

further controlling the actual communication to understand the recognized items in a context of the application in question through assigning the recognized items to one or more of a plurality of speech understanding facilities to generate newly understood speech items that have been understood;

wherein said dynamically assigning step further comprises assigning to an instantaneously determined best suited speech recognizing facility in a distributed manner and based on a combination of contingency and statistical measures.

2. A method as claimed in claim 1, wherein said speech understanding is assigned back to the origin station in question.

3. A method as claimed in claim 1, wherein said speech understanding is assigned in a dynamic manner.

4. A system arranged for executing the method as claimed in claim 1.

5. A subsystem facility arranged for operating in a method context as claimed in claim 1.

* * * * *